US011897781B2

(12) United States Patent
Steurenthaler et al.

(10) Patent No.: US 11,897,781 B2
(45) Date of Patent: Feb. 13, 2024

(54) METHOD FOR PRODUCING HYDROGEN CYANIDE

(71) Applicant: EVONIK OPERATIONS GMBH, Essen (DE)

(72) Inventors: Martin Steurenthaler, Bad Vilbel (DE); Martin Steffan, Alzenau-Wasserlos (DE); Thomas Müller, Altenstadt (DE); Manfred Bäuml, Brühl (DE)

(73) Assignee: Evonik Operations GmbH, Essen (DE)

( * ) Notice: Subject to any disclaimer, the term of this patent is extended or adjusted under 35 U.S.C. 154(b) by 652 days.

(21) Appl. No.: 16/337,156

(22) PCT Filed: Sep. 26, 2017

(86) PCT No.: PCT/EP2017/074381
§ 371 (c)(1),
(2) Date: Mar. 27, 2019

(87) PCT Pub. No.: WO2018/060196
PCT Pub. Date: Apr. 5, 2018

(65) Prior Publication Data
US 2019/0225501 A1 Jul. 25, 2019

(30) Foreign Application Priority Data
Sep. 28, 2016 (EP) .................... 16191019

(51) Int. Cl.
C01C 3/02 (2006.01)
B01J 12/00 (2006.01)
B01J 19/24 (2006.01)
B01J 23/42 (2006.01)

(52) U.S. Cl.
CPC .......... C01C 3/0229 (2013.01); B01J 12/005 (2013.01); B01J 19/2425 (2013.01); B01J 23/42 (2013.01); B01J 2219/00038 (2013.01); B01J 2219/00051 (2013.01); B01J 2219/00182 (2013.01); B01J 2219/0883 (2013.01); B01J 2219/247 (2013.01)

(58) Field of Classification Search
None
See application file for complete search history.

(56) References Cited

U.S. PATENT DOCUMENTS

| 2,987,382 A | 6/1961 | Endter et al. |
| 3,156,544 A | 11/1964 | Eck et al. |
| 3,970,435 A | 7/1976 | Schultz et al. |
| 4,289,741 A | 9/1981 | Voigt et al. |
| 4,317,808 A | 3/1982 | Voigt et al. |
| 4,370,261 A | 1/1983 | Wunder et al. |
| 4,370,492 A | 1/1983 | Wunder et al. |
| 4,440,727 A | 4/1984 | Bruck et al. |
| 4,617,878 A | 10/1986 | Paquet |
| 4,853,190 A | 8/1989 | Manner et al. |
| 4,961,914 A | 10/1990 | Witzel et al. |
| 5,039,643 A | 8/1991 | Hecht et al. |
| 5,097,091 A | 3/1992 | Kremer et al. |
| 5,785,942 A | 7/1998 | von Hippel et al. |
| 5,928,984 A * | 7/1999 | von Hippel ............... B01J 23/40 423/376 |
| 6,048,512 A | 4/2000 | von Hippel et al. |
| 6,221,327 B1 * | 4/2001 | DeCourcy ................ B01J 8/008 423/376 |
| 6,534,028 B2 | 3/2003 | von Hippel et al. |
| 7,429,370 B2 | 9/2008 | von Hippel et al. |
| 8,114,355 B2 | 2/2012 | Higuchi et al. |
| 10,441,942 B2 | 10/2019 | Steffan et al. |
| 2002/0085967 A1 | 7/2002 | Yokota |
| 2003/0175196 A1 | 9/2003 | Blackwell et al. |
| 2005/0131263 A1 | 6/2005 | Wolpert et al. |
| 2005/0232857 A1 | 10/2005 | Lomax et al. |
| 2008/0014342 A1 | 1/2008 | Jakobi et al. |
| 2008/0135223 A1 | 6/2008 | Wolpert et al. |
| 2008/0234527 A1 | 9/2008 | Matsumoto et al. |
| 2010/0284889 A1 | 11/2010 | Boehling et al. |
| 2012/0141345 A1 | 6/2012 | Slaten |
| 2015/0151273 A1 | 6/2015 | Rizzi et al. |

(Continued)

FOREIGN PATENT DOCUMENTS

AU 639926 5/1990
DE 1 078 554 3/1960

(Continued)

OTHER PUBLICATIONS

International Search Report for PCT/ EP2017/074381 (international counterpart of U.S. Appl. No. 16/337,156 application ), filed Sep. 26, 2017.
Written Opinion of the International Searching Authority for PCT/ EP2017/074381 (international counterpart of U.S. Appl. No. 16/337,156 application ), filed Sep. 26, 2017.
International Preliminary Report on Patentability for PCT/ EP2017/ 074381 (international counterpart of U.S. Appl. No. 16/337,156 application ), filed Sep. 26, 2017.
European Search Report for EP 16 19 1019 (European counterpart of U.S. Appl. No. 16/337,156), filed Sep. 28, 2016.

(Continued)

Primary Examiner — Anita Nassiri-Motlagh
(74) Attorney, Agent, or Firm — Law Office of: Michael A. Sanzo, LLC

(57) ABSTRACT

In a method for producing hydrogen cyanide by passing a feed mixture comprising ammonia and methane through reaction tubes, coated on the inner surface with a catalyst comprising platinum, at a reaction temperature of 1000° C. to 1400° C., operated for a time period of at least 100 h, the concentration difference between the ammonia concentration and the methane concentration in the product gas mixture is maintained in a range of from 1.05 % by volume to 3.0% by volume for at least 80% of the time.

16 Claims, No Drawings

(56) References Cited

U.S. PATENT DOCUMENTS

| | | | |
|---|---|---|---|
| 2016/0145114 A1 | 5/2016 | Glöckler et al. | |
| 2016/0263558 A1 | 9/2016 | Steffan et al. | |
| 2020/0115334 A1 | 4/2020 | Hierold et al. | |

FOREIGN PATENT DOCUMENTS

| | | | |
|---|---|---|---|
| DE | 24 21 166 | 11/1975 | |
| DE | 29 23 596 | 12/1980 | |
| DE | 29 36 844 | 4/1981 | |
| DE | 34 20 579 | 2/1985 | |
| DE | 41 28 201 | 3/1993 | |
| GB | 763461 | 12/1956 | |
| GB | 969796 | 9/1964 | |
| JP | 53-030491 | 9/1976 | |
| JP | S59-222428 | 12/1984 | |
| WO | WO 2004/076351 | 9/2004 | |
| WO | WO 2006/050781 | 5/2006 | |
| WO | WO-2015052066 A1 * | 4/2015 | .............. B01J 21/04 |
| WO | WO 2018/060196 | 4/2018 | |

OTHER PUBLICATIONS

Office Action dated Jul. 20, 2017 for copending U.S. Appl. No. 14/896,719.
Response to Office Action of Jul. 20, 2017 for co-pending U.S. Appl. No. 14/896,719, filed Sep. 20, 2017.
Office Action dated Dec. 13, 2017 for copending U.S. Appl. No. 14/896,719.
Response to Office Action dated Dec. 13, 2017 for copending U.S. Appl. No. 14/896,719, filed Mar. 13, 2018.
Final Office Action for copending U.S. Appl. No. 14/896,719, dated Jul. 12, 2018.
Response to Final Office Action for copending U.S. Appl. No. 14/896,719, filed Oct. 12, 2018.
Advisory Action for copending U.S. Appl. No. 14/896,719, dated Oct. 29, 2018.
Appeal Brief for copending U.S. Appl. No. 14/896,719, filed Feb. 10, 2019.
Office Action dated Aug. 23, 2017 for copending U.S. Appl. No. 15/028,415.
Response to Office Action dated Aug. 23, 2017 for copending U.S. Appl. No. 15/028,415, filed Nov. 19, 2017.
Office Action for copending U.S. Appl. No. 15/028,415, dated Mar. 7, 2018.
Response to Office Action dated Mar. 7, 2018 and RCE for copending U.S. Appl. No. 15/028,415, filed Jul. 7, 2015.
Office Action for copending U.S. Appl. No. 15/028,415, dated Aug. 27, 2018.
Response to Office Action dated Aug. 27, 2018 for copending U.S. Appl. No. 15/028,415, filed Feb. 25, 2019.
Albers, et al., "XPS and SIMS studies of carbon deposits on $Pt/Al_2O_3$ and $Pd/SiO_2$ catalysts applied in the synthesis of hydrogen cyanide and selective hydrogenation of acetylene," *Applied Catalysis A: General* 176(1):135-146 (Jan. 1999).
Diefenbach, et al., "HCN SynthesisFrom Methane and Ammonia: Mechanisms of $Pt^+$-Mediated C-N Coupling," *J. Amer. Chem. Soc.* 121:10614-10625 (1999).
Endter, et al., "Die technische Synthese von Cyanwasserstoff aus Mathan und Ammoniak ohne Zusatz von Sauerstoff," *Chemie-Ing-Techn* 30:305-310 (1958), (in German with machine translation of the abstract attached).
Sauer, et al., "Hydrocyanic Acid (HCN) Production," in: Handbook of Heterogeneous Catalysis, Part 12, Inorganic Reactions, pp. 2592-2609 (2008).
U.S. Appl. No. 14/896,719, filed Dec. 8, 2015, US-2016/0145114 A1, May 26, 2016, Glöckler.
U.S. Appl. No. 15/028,415, filed Apr. 8, 2016, US-2016/0263558 A1, Sep. 15, 2016, Steffan.
Examiner''s Answer dated Apr. 8, 2020 for copending U.S. Appl. No. 14/896,719.
Reply Brief filed Jun. 26, 2020 for copending U.S. Appl. No. 14/896,719.
U.S. Appl. No. 16/471,338, filed Dec. 15, 2017, US 2020/0115334, Apr. 16, 2020, Hierold.

* cited by examiner

METHOD FOR PRODUCING HYDROGEN CYANIDE

CROSS REFERENCE TO RELATED APPLICATIONS

The present application is US national stage of international application PCT/EP2017/074381, which had an international filing date of Sep. 26, 2017, and which was published on Apr. 5, 2018. Priority is claimed to European application EP 16191019.5, filed on Sep. 28, 2016.

FIELD OF THE INVENTION

The present invention relates to a method for producing hydrogen cyanide by reacting ammonia with methane which allows operating a production unit at name plate capacity for hydrogen cyanide for longer time periods.

BACKGROUND OF THE INVENTION

In the so called BMA process (Blausäure aus Methan and Ammoniak) for producing hydrogen cyanide on an industrial scale, a feed mixture comprising ammonia and methane is reacted on a catalyst comprising platinum in an endothermal reaction at a reaction temperature of 1000° C. to 1400° C. to provide a product gas mixture comprising hydrogen cyanide and hydrogen. In industrial plants for making hydrogen cyanide by the BMA process, the feed mixture is passed through aluminium oxide reaction tubes coated on the inner surface with a platinum catalyst and these reaction tubes are arranged in parallel in gas heated reaction furnaces.

At the high temperatures used in the BMA process, methane and other hydrocarbons contained in the feed mixture can be decomposed to carbon and hydrogen and ammonia can be decomposed to nitrogen and hydrogen. The BMA process is therefore usually operated with incomplete methane conversion using a molar excess of ammonia to provide a product gas mixture containing unreacted ammonia and unreacted methane, with the ammonia concentration being higher than the methane concentration. Molar ratios of ammonia to carbon in the feed mixture in a range of from 1.01:1 to 1.30:1 have been reported in the literature. F. Endter, Chemie-Ing.-Techn. 30 (1958) 305-310 discloses operation of an industrial plant with a molar ratio of ammonia to carbon of 1.05:1 in the feed mixture to provide a product gas mixture containing 71.8% by volume hydrogen, 22.9% by volume hydrogen cyanide, 2.5% by volume ammonia, 1.7% by volume methane and 1.1% by volume nitrogen.

DE 29 47 498 A1 discloses recovery of unreacted ammonia from the product gas mixture of the BMA process by absorption on a zeolite followed by desorption. A product gas mixture containing 22-25% HCN, 2-5% $NH_3$, 70-75% $H_2$ and traces of water, $CH_4$ and $N_2$ is disclosed for examples where the BMA process was carried out in a laboratory furnace containing a single reaction tube.

Decomposition of methane and other hydrocarbons during the BMA process leads to formation of carbon deposits on the inner surface of the reaction tubes and may eventually lead to blocking of reaction tubes. Since aluminium oxide is brittle, aluminium oxide reaction tubes may also break during operation. Operation of a reaction furnace may be continued when a reaction tube gets blocked or broken by shutting off the gas supply to the reaction tube. However, maintaining a desired production rate for hydrogen cyanide then requires increasing the feed rates to the remaining reaction tubes and increasing the reaction temperature to achieve sufficient conversion at the increased feed rate. This can be done only up to a certain limit and a reaction furnace has to be taken out of service for replacing blocked or broken reaction tubes when the number of reaction tubes out of operation exceeds a certain limit. The cooling of the reaction furnace, necessary for replacing reaction tubes, and the reheating to the reaction temperature puts mechanical stress on the furnace material and reduces the service time of the reaction furnace. Shutting down a reaction furnace also temporarily lowers the output of a hydrogen cyanide production plant. Therefore, there is an incentive for operating reaction furnaces in the BMA process for time periods as long as possible.

DE 24 21 166 teaches that longer operating periods can be achieved for the BMA process by periodically removing carbon deposits that form inside the reaction tubes by temporarily passing a stream of carbon dioxide through a reaction tube when the pressure drop along the reaction tube has increased by 25 to 45%. DE 24 21 166 further suggests additional ammonia treatments at intervals of 3 to 7 days, where the molar ratio of ammonia to carbon of 1.05 to 1.075 used in regular operation is temporarily raised to 1.20 to 1.30 for a time period that shall not exceed 20 minutes. DE 24 21 166 also suggests that for reaction furnaces containing reaction tubes of different age the ammonia content in the feed mixture shall be adjusted to provide an ammonia concentration in the product gas mixture that is from 0.5 to 1% by volume higher than the methane concentration in the product gas mixture. DE 24 21 166 teaches in this context that such a slightly increased ammonia content does not damage the catalyst.

SUMMARY OF THE INVENTION

It has now been found that the time period for which a reaction furnace can be operated in the BMA process until blocked or broken reaction tubes need to be replaced can be considerably extended by operating the process to maintain the concentration difference between the ammonia concentration in the product gas mixture and the methane concentration in the product gas mixture at a value higher than 1% by volume for most of the time, compared to prior art processes which maintain this concentration difference in a range of from 0.5 to 1% by volume.

Subject of the invention is therefore a method for producing hydrogen cyanide, comprising passing a feed mixture comprising ammonia and methane through reaction tubes, coated on the inner surface with a catalyst comprising platinum, at a reaction temperature of 1000° C. to 1400° C. to provide a product gas mixture comprising hydrogen cyanide, hydrogen, unreacted ammonia and unreacted methane, the ammonia concentration in said product gas mixture being higher than the methane concentration in said product gas mixture, wherein for a time period of at least 100 h a concentration difference between said ammonia concentration and said methane concentration is maintained in a range of from 1.05% by volume to 3.0% by volume for at least 80% of the time by adjusting the reaction temperature, adjusting the molar ratio of ammonia to carbon in the feed mixture, adjusting a feed rate of said feed mixture, or any combination of said adjustments.

DETAILED DESCRIPTION OF THE INVENTION

In the method of the invention for producing hydrogen cyanide, a feed mixture comprising ammonia and methane is passed through reaction tubes which are coated on the inner surface with a catalyst comprising platinum. The reaction of ammonia with methane is carried out at a reaction temperature of from 1000° C. to 1400° C. and provides a product gas mixture comprising hydrogen cyanide, hydrogen, unreacted ammonia and unreacted methane.

The feed mixture preferably comprises ammonia and methane as the main components and may comprise further hydrocarbons, such as ethane or propane, in addition to methane. However, the content of hydrocarbons other than methane is preferably kept low and methane preferably makes up at least 90% by volume and more preferably at least 98% by volume of the hydrocarbons contained in the gaseous feed mixture. The use of a feed mixture with a low content of hydrocarbons other than methane reduces formation of carbon deposits in the reaction tube caused by thermal cracking of higher hydrocarbons.

The combined amount of ammonia and methane in the feed mixture is preferably at least 90% by volume and more preferably at least 98% by volume. The feed mixture preferably has a low content of oxygen and preferably comprises less than 4% by volume of oxygen, more preferably less than 1% by volume of oxygen. The feed mixture is preferably prepared by mixing natural gas and gaseous ammonia. Preferably, a purified natural gas from a natural gas distribution network is used from which carbon dioxide and sulfur compounds have been removed. The feed mixture preferably comprises a slight molar excess of ammonia over methane and other hydrocarbons with a molar ratio of ammonia to carbon of from 1.01:1 to 1.30:1, preferably from 1.05:1 to 1.16:1. The use of a molar excess of ammonia allows for a high conversion of methane and reduces formation of carbon deposits in the reaction tube caused by thermal cracking of methane.

The reaction of ammonia with methane is carried out at a reaction temperature of from 1000° C. to 1400° C. in the presence of a catalyst comprising platinum metal by passing the feed mixture through reaction tubes which are coated on the inner surface with the catalyst. The reaction of methane and ammonia to hydrogen cyanide and hydrogen is endothermal and the required reaction temperature is typically provided by external heating of the reaction tubes. The reaction is preferably carried out in reaction furnaces which preferably contain from 10 to 130 reaction tubes operated in parallel and the reaction tubes are preferably heated with combustion gases from gas burners using natural gas or a mixture of natural gas and hydrogen as fuel. Each reaction furnace preferably has a feed conduit for distributing the feed mixture to the reaction tubes of the furnace and a product conduit collecting the product gas mixture formed in the reaction tubes of the furnace. Suitable reaction furnaces are known from the prior art, such as from DE 1 041 476, EP 0 074 504 A1 and EP 0 125 395 A2.

The reaction tubes are preferably made from a temperature resistant ceramic material, such as aluminium oxide or silicon carbide, and are preferably made from gas-tight sintered aluminium oxide. Suitable cylindrical aluminium oxide tubes of about 2 m length and about 2 cm internal diameter are commercially available. The reaction tube can be coated with the platinum catalyst using methods known from the prior art, such as from EP 0 299 175 A1, EP 0 407 809 A1 and EP 0 803 470 A1. The reaction tubes may comprise inserts, as described in DE 1 078 554, WO 2006/050781 A2 and WO 2015/052066 A1, or ribs on the inner surface, as described in WO 2014/198502 A1, to improve heat transfer to the feed mixture.

The reaction of ammonia with methane provides a product gas mixture comprising hydrogen cyanide, hydrogen, unreacted ammonia and unreacted methane. The ammonia concentration in the product gas mixture is typically higher than the methane concentration and an ammonia concentration higher than the methane concentration can easily be achieved by adjusting the molar ratio of ammonia to carbon in the feed mixture within the range of 1.01:1 to 1.30:1 described above. The product gas mixture may also contain nitrogen formed by decomposition of ammonia to nitrogen and hydrogen.

The method of the invention aims at operating the reaction tubes used for producing hydrogen cyanide for as long as possible when producing hydrogen cyanide at a name plate capacity. This is achieved by adjusting the reaction conditions to maintain an ammonia concentration in the product gas mixture that is from 1.05% by volume to 3.0% by volume higher than the methane concentration in the product gas mixture for at least 80% of the time. The concentration difference between the ammonia concentration and the methane concentration is preferably from 1.1% by volume to 2.5% by volume. The concentration difference between the ammonia concentration and the methane concentration can be maintained in this range by adjusting the reaction temperature, adjusting the molar ratio of ammonia to carbon in the feed mixture, adjusting a feed rate of said feed mixture, or any combination of these measures. Increasing the reaction temperature will lead to a decrease in the concentration difference and decreasing the reaction temperature will lead to an increase in the concentration difference. Increasing the molar ratio of ammonia to carbon in the feed mixture will lead to an increase in the concentration difference and decreasing the molar ratio of ammonia to carbon in the feed mixture will lead to a decrease in the concentration difference. Increasing the feed rate of the feed mixture will lead to an increase in the concentration difference and decreasing the feed rate of the feed mixture will lead to a decrease in the concentration difference. Preferably, the molar ratio of ammonia to carbon in the feed mixture is kept constant and the concentration difference is maintained by adjusting the reaction temperature. When the reaction temperature, the molar ratio of ammonia to carbon in the feed mixture and the feed rate of the feed mixture are kept constant, the concentration difference between the ammonia concentration and the methane concentration in the product gas mixture will change over time as a result of catalyst aging. Maintaining a constant concentration difference therefore in general requires to adjust the operating conditions over time.

The operating conditions are in general adjusted to provide a high conversion of methane and other hydrocarbons contained in the feed mixture, preferably providing a methane concentration in the product gas mixture of less than 4% by volume.

The advantages of the claimed method are achieved by maintaining the concentration difference between the ammonia concentration and the methane concentration in a range of from 1.05% by volume to 3.0% by volume for a sufficiently long time period of at least 100 h. The time period may be from 100 to 100,000 h, preferably from 4,000 to 40,000 h. The time period preferably encompasses the entire operating time of a reaction furnace, except for the phase of conditioning the catalyst at the first start-up of a reaction tube, which in general takes from 15 to 60 h. The concentration difference does not have to be in the range of from 1.05% by volume to 3.0% by volume throughout the entire time period, but may be lower for up to 20% of the time period. The concentration difference should not be higher than 3.0% by volume for any extended time span. Preferably, during the time period of at least 100 h the concentration difference is no more than 3.0% by volume for at least 95% of the time and preferably for at least 98% of the time.

An increased concentration difference can be tolerated for a short time span, for example for carrying out the method for preventing soot deposition in the reaction tubes described in DE 24 21 166 A1 on page 4, lines 25 to 36. For this purpose, it is preferred to increase the molar ratio of ammonia to carbon in the feed mixture by 10 to 30% for a time span of no more than 30 min at time intervals of from 15 to 300 h.

In a preferred embodiment, the concentration difference is maintained at a constant value in the range of from 1.1% by volume to 2.1% by volume for at least 95% of the time. Keeping a constant concentration difference in this narrow range for at least 95% of the time is particularly effective in preventing the blocking or breaking of reaction tubes.

Compared to a prior art process operated with a concentration difference of less than 1.1% by volume, the method of the invention not only allows for longer operating periods of reaction furnaces, but also allows to achieve the same output rate for hydrogen cyanide at a lower reaction temperature, which increases the lifetime of the reaction furnaces and reduces heat losses occurring during heating the reaction tubes, thus reducing the energy consumption of the process.

The method of the invention is particularly advantageous for producing hydrogen cyanide with a multitude of reaction tubes operated in parallel at a constant hydrogen cyanide production rate, where a loss in production capacity caused by blocking or breaking of reaction tubes is compensated by increasing the feed rate to the remaining reaction tubes. Such an increase of the feed rate to individual reaction tubes over the operating time will lead to a reduction in the yield of hydrogen cyanide. Therefore, although the yield of hydrogen cyanide calculated on the ammonia fed is initially slightly lower for the method of the invention compared to a prior art process operated with a concentration difference of less than 1.1% by volume, the average yield on ammonia over the entire operating time is higher for the method of the invention, which is surprising for a method operated with a higher concentration of non-converted ammonia.

The concentrations of ammonia and methane in the product gas mixture can be determined by conventional methods for gas analysis. For example, the concentration of ammonia may be determined by absorbing ammonia in a solution containing a known amount of acid and titrating the non-consumed acid. Methane may be determined by GC analysis after absorbing ammonia and hydrogen cyanide from the product gas with acidic and alkaline aqueous solutions. Preferably, the concentrations of ammonia and methane in the product gas mixture are measured simultaneously by IR spectroscopy or by gas chromatography. IR analysis of the product gas mixture can be carried out based on the IR absorption of ammonia at 1718 $cm^{-1}$ and of methane at 2940 $cm^{-1}$ and calibration with mixtures of known composition. IR analysis is preferably carried out with a FT-IR spectrometer. GC analysis of the product gas mixture is preferably carried out with different columns for methane and ammonia analysis using a sample splitter. Methane is preferably analyzed with a packed molecular sieve column and ammonia is preferably analyzed with a capillary column, such as a PoraPLOT Q column from Agilent J&W.

The method of the invention is preferably carried out in a plant comprising one or more reactors, with each reactor comprising at least two reaction furnaces operated in parallel. Each reaction furnace comprises from 10 to 130 reaction tubes operated in parallel. Preferably, reaction furnaces as described further above are used. Each reactor of the plant comprises a reactor product conduit which collects the product gas mixture of the reaction furnaces of the reactor. The plant preferably comprises from 1 to 30 reactors, more preferably 2 to 15 reactors, with each reactor comprising from 2 to 20 reaction furnaces, preferably 8 to 16 reaction furnaces.

The ammonia concentration and the methane concentration can be analyzed in the combined product gas mixture from a single reaction furnace, in the combined product gas mixture in a reactor product conduit, or in both product gas mixtures, in order to determine the concentration difference for a reaction furnace or an entire reactor. Preferably, the concentrations of ammonia and methane in the product gas mixture are measured simultaneously by IR spectroscopy or by gas chromatography.

Preferably, the operating conditions are adjusted for each reaction furnace of the plant to maintain the concentration difference in the combined product gas mixture from the reaction furnace within the range of from 1.05% by volume to 3.0% by volume, i.e. for each reaction furnace the concentration difference is maintained in the combined product gas mixture from the reaction furnace. The reaction furnaces of a reactor may be operated at different concentration differences within this range. Similarly, the reactors of the plant may be operated at different concentration differences within this range. Preferably, each reactor of the plant is operated at the same concentration difference and more preferably, each reaction furnace is operated at the same concentration difference.

When a reaction tube gets blocked or broken, the feeding of the feed mixture to this reaction tube is preferably stopped to allow further operation of the reaction furnace containing the blocked or broken reaction tube with the remaining reaction tubes. The rate of feeding the feed mixture to the reaction furnace containing the blocked or broken reaction tube can be increased to maintain a constant production rate for hydrogen cyanide. Preferably, the rate of feeding the feed mixture to the reactor containing the blocked or broken reaction tube is kept essentially constant, which has the effect that the feed to the blocked or broken reaction tube is not only redirected to other reaction tubes of the same reaction furnace, but also to other reaction furnaces of the reactor. Preferably, the reaction temperature of the reaction furnace or the reaction furnaces to which feed of a blocked or broken reaction tube is redirected are increased in order to maintain a constant concentration difference for the reaction furnace or the reactor.

In order to prevent the blocking of reaction tubes by carbon deposits, one or more reaction tubes of a reaction furnace may be temporarily taken out of operation for removing carbon deposits by passing carbon dioxide through the reaction tube or the reaction tubes of the furnace while the furnace is further heated, preferably applying the procedure described in DE 24 21 166 A1.

EXAMPLES

Example 1 (Comparative Example)

A cylindrical reaction tube composed of sintered aluminium oxide of length 2100 mm and internal diameter 17 mm was coated with a platinum-containing catalyst and activated as described in example 6 of EP 0 407 809 A. A feed gas stream composed of 28.0 mol/h ammonia and 25.5 mol/h methane, having a molar ratio of ammonia to carbon of 1.10, was then passed from below through the vertically oriented reaction tube heated to 1240° C. in a laboratory oven. The product gas mixture exiting from the reaction tube was analyzed. The yield of hydrogen cyanide was 87.8% based on ammonia and 96.6% based on methane.

Example 2

Example 1 was repeated with a feed gas stream composed of 36.0 mol/h ammonia and 32.7 mol/h methane, having the same molar ratio of ammonia to carbon of 1.10 as in example 1. The yield of hydrogen cyanide was 83.8% based on ammonia and 92.1% based on methane.

Example 3

A reaction tube prepared as in example 1 was employed, which had been used for more than 150 h in previous experiments for making hydrogen cyanide at operating conditions where the concentration difference between the ammonia concentration and the methane concentration in the product gas mixture was less than 1% by volume. A feed gas stream composed of 28.0 mol/h ammonia and 24.6 mol/h methane, having a molar ratio of ammonia to carbon of 1.14, was then passed from below through the vertically oriented reaction tube heated to 1330° C. in a laboratory oven. The product gas mixture exiting from the reaction tube was analyzed after a stationary state was reached. The temperature of the laboratory oven was then reduced to 1180° C. in steps of 30° C., each time waiting until a stationary state was reached before analyzing the product gas mixture. Table 1 gives the concentrations of ammonia and methane in the product gas mixture, the concentration difference, the yields of hydrogen cyanide based on ammonia and on methane, as well as the energy consumption calculated from the amount of hydrogen cyanide produced and the amount of gas burnt for heating the laboratory oven.

TABLE 1

| | Oven temperature in ° C. | | | | | |
|---|---|---|---|---|---|---|
| | 1330 | 1300 | 1270 | 1240 | 1210 | 1180 |
| $NH_3$ concentration in % by volume | 0.4 | 0.9 | 1.6 | 2.3 | 3.5 | 8.2 |
| $CH_4$ concentration in % by volume | 0.3 | 0.4 | 0.5 | 0.7 | 1.4 | 5.6 |
| Concentration difference in % by volume | 0.1 | 0.5 | 1.1 | 1.6 | 2.1 | 2.6 |
| HCN yield based on $NH_3$ in % | 86.4 | 86.1 | 85.6 | 85.0 | 82.2 | 70.2 |
| HCN yield based on $CH_4$ in % | 98.5 | 98.2 | 97.8 | 97.2 | 94.0 | 80.0 |
| Energy consumption in kJ/g HCN | 54.1 | 51.4 | 49.0 | 46.8 | 45.5 | 47.0 |

Example 4 (Comparative)

A reactor of a production plant comprising 10 reaction furnaces of a design as described in EP 0 125 395 A2, each reaction furnace containing 26 reaction tubes, was operated with a feed mixture of methane and ammonia having a molar ratio of ammonia to carbon of 1.09. The feed stream was adjusted to maintain a hydrogen cyanide output of about 179 kg/h and the reaction furnace temperature was adjusted to maintain a concentration difference between the ammonia concentration and the methane concentration in the product gas mixture of about 0.5% by volume. Concentrations of ammonia and methane were measured in the reactor product conduit by IR spectroscopy and GC analysis. In order to prevent a build up of carbon deposits in the reaction tubes, the molar ratio of ammonia to carbon in the feed mixture was temporarily increased by 20% in intervals of 2 days for a time span of 15 min. As a further measure, carbon dioxide was passed through the reaction tubes following the procedure described in DE 24 21 166 A1 in intervals of about 28 days. Table 2 gives the HCN yields, the number of reaction tubes blocked or broken, the average load per reaction tube in use and the average reaction furnace temperature for a time period of 19200 h runtime.

TABLE 2

| Runtime in h | 4800 | 9600 | 14400 | 19200 |
|---|---|---|---|---|
| Average reaction furnace temperature in ° C. | 1316 | 1323 | 1331 | 1342 |
| Concentration difference in % by volume | 0.5 | 0.5 | 0.6 | 0.6 |
| Number of reaction tubes blocked or broken | 2 | 10 | 28 | 47 |
| Average load per reaction tube in use in mol $NH_3$/h | 30.5 | 31.8 | 35.2 | 39.8 |
| HCN yield based on $NH_3$ in % | 84.2 | 83.4 | 81.1 | 78.1 |
| HCN yield based on $CH_4$ in % | 91.2 | 90.4 | 87.8 | 84.4 |
| Hydrogen cyanide output in kg/h | 179 | 179 | 179 | 179 |

Example 5

Example 4 was repeated with a feed mixture of natural gas and ammonia having a molar ratio of ammonia to carbon of 1.10 and the reaction furnace temperature was adjusted to maintain a concentration difference between the ammonia concentration and the methane concentration in the product gas mixture of about 1.3% by volume. Since the formation of carbon deposits in the reaction tubes occurred more slowly than in example 4, the molar ratio of ammonia to carbon in the feed mixture was temporarily increased in intervals of 5 days and carbon dioxide was passed through the reaction tubes in intervals of about 3 to 4 months. Table 3 gives the results.

TABLE 3

| Runtime in h | 4800 | 9600 | 14400 | 19200 |
|---|---|---|---|---|
| Average reaction furnace temperature in ° C. | 1291 | 1293 | 1295 | 1299 |
| Concentration difference in % by volume | 1.3 | 1.3 | 1.4 | 1.4 |
| Number of reaction tubes blocked or broken | 3 | 7 | 12 | 19 |
| Average load per reaction tube in use in mol $NH_3$/h | 30.8 | 31.5 | 32.3 | 33.5 |
| HCN yield based on $NH_3$ in % | 83.5 | 83.0 | 82.6 | 82.0 |
| HCN yield based on $CH_4$ in % | 91.9 | 91.3 | 90.8 | 90.3 |
| Hydrogen cyanide output in kg/h | 179 | 179 | 179 | 179 |

The invention claimed is:

1. A method for producing hydrogen cyanide, comprising passing a feed mixture comprising ammonia and methane through reaction tubes, coated on the inner surface with a catalyst comprising platinum, at a reaction temperature of 1000° C. to 1400° C. to provide a product gas mixture comprising hydrogen cyanide, hydrogen, unreacted ammonia and unreacted methane, the ammonia concentration in said product gas mixture being higher than the methane concentration in said product gas mixture, wherein for a time period of at least 100 h a concentration difference between said ammonia concentration and said methane concentration is maintained in a range of from 1.05% by volume to 3.0% by volume for at least 80% of the time by adjusting the reaction temperature, adjusting the molar ratio of ammonia to carbon in the feed mixture, adjusting a feed rate of said feed mixture, or any combination of said adjustments.

2. The method of claim 1, wherein during said time period said concentration difference is no more than 3.0% by volume for at least 95% of the time.

3. The method of claim 1, wherein for at least 95% of the time said concentration difference is maintained at a constant value in the range of from 1.1% by volume to 2.1% by volume.

4. The method of claim 1, wherein the combined amount of ammonia and methane in said feed mixture is at least 90% by volume.

5. The method of claim 1, wherein said feed mixture comprises less than 4% by volume of oxygen.

6. The method of claim 1, wherein the molar ratio of ammonia to carbon in the feed mixture is kept constant and the concentration difference is maintained by adjusting the reaction temperature.

7. The method of claim 1, wherein the methane concentration in the product gas mixture is less than 4% by volume.

8. The method of claim 1, wherein at time intervals of from 15 to 300 h the molar ratio of ammonia to carbon in the feed mixture is increased by 10 to 30% for a time span of no more than 30 min.

9. The method of claim 1, wherein said method is carried out in a plant comprising one or more reactors, each reactor comprising at least two reaction furnaces operated in parallel and a reactor product conduit collecting the product gas mixture of the reaction furnaces, and each reaction furnace comprising from 10 to 130 reaction tubes operated in parallel.

10. The method of claim 9, wherein the ammonia concentration and the methane concentration is measured by IR spectroscopy in the product gas mixture from a single reaction furnace, the product gas mixture in the reactor product conduit, or both.

11. The method of claim 9, wherein the ammonia concentration and the methane concentration is measured by gas chromatography in the product gas mixture from a single reaction furnace, the product gas mixture in the reactor product conduit, or both.

12. The method of claim 9, wherein for each reaction furnace said concentration difference is maintained in the product gas mixture from the reaction furnace.

13. The method of claim 9, wherein feeding of said feed mixture to a reaction tube is stopped when the reaction tube gets blocked or broken and a rate of feeding said feed mixture to the reaction furnace containing the blocked or broken reaction tube or a rate of feeding said feed mixture to the reactor containing the blocked or broken reaction tube is increased to maintain a constant production rate for hydrogen cyanide.

14. The method of claim 9, wherein a reaction tube or a reaction furnace is temporarily taken out of operation for removing carbon deposits by passing carbon dioxide through the reaction tube or the reaction tubes of the furnace.

15. The method of claim 9, wherein the plant comprises from 1 to 30 reactors and each reactor comprises from 2 to 20 reaction furnaces.

16. The method of claim 1, wherein the concentration difference is maintained for a time period of from 100 h to 100,000 h.

* * * * *